United States Patent [19]

Atkinson

[11] 3,769,604

[45] Oct. 30, 1973

[54] SWITCHED AND SUMMED FILTER ARRANGEMENT

[75] Inventor: Noel D. Atkinson, Indianapolis, Ind.

[73] Assignee: General Aviation Electronics, Inc., Indianapolis, Ind.

[22] Filed: Mar. 12, 1971

[21] Appl. No.: 123,795

[52] U.S. Cl. .................. 330/30 R, 330/51, 330/126

[51] Int. Cl. .................. H03f 3/68

[58] Field of Search .................. 330/30 R, 51, 126; 328/152, 154, 103; 307/242; 325/163; 179/15 R; 331/179

[56] References Cited

UNITED STATES PATENTS

| | | | |
|---|---|---|---|
| 2,521,752 | 9/1950 | Schwarz | 330/51 X |
| 3,662,274 | 5/1972 | Pritchard et al. | 330/149 X |
| 2,879,387 | 3/1959 | Kahn | 331/179 |
| 3,202,927 | 8/1965 | Ishimoto et al. | 330/124 R |
| 2,229,089 | 1/1941 | Kinsburg | 328/152 X |
| 2,716,161 | 8/1955 | Gray | 330/126 |
| 1,454,495 | 8/1923 | Vennes | 179/15 R |

*Primary Examiner*—Roy Lake
*Assistant Examiner*—James B. Mullins
*Attorney*—Woodard, Weikart, Emhardt & Naughton

[57] ABSTRACT

A transmitter circuit for use in a multi-frequency transmitter which uses a two input diplexer to combine the outputs of separate bandpass filters tuned to adjacent bands. A mixer is connected to one or the other of the filters depending upon the band in which the desired frequency occurs. The connection of the mixer to the filters is accomplished by transistor amplifiers which can be biased off to disconnect.

12 Claims, 3 Drawing Figures

INVENTOR
NOEL D. ATKINSON
BY
Woodard, Weikart, Emhardt & Naughton
ATTORNEYS

INVENTOR
NOEL D. ATKINSON
BY
Woodard, Weikart, Emhardt & Naughton
ATTORNEYS

SWITCHED AND SUMMED FILTER ARRANGEMENT

BACKGROUND OF THE INVENTION

1. Field of the Invention

This invention relates to a filtering circuit for a frequency source which allows operation in more than one band.

2. Description of the Prior Art

Mixing circuits which operate in more than one band are well known. They often are changed from one band to another by mechanical switches which substitute one bandpass filter for another. Diode and transistor switching circuits are known in certain applications to replace mechanical switches.

The U.S. Pat. to G.W. Gray (No. 2,716,161) discloses a band selecting vacuum tube which can cause a signal to pass through one resonant circuit or another, depending upon which tube section is biased to amplify. One of the disadvantages of this type of circuit is that the attenuation curve of the resonant circuit is not very steep at the edges of the bandpass. To achieve an improved attenuation curve in a bandpass circuit, additional filter components are required. To do this would further aggravate the problem of isolating one filter from the other to prevent their interaction. The circuit in Gray reduces the adverse effects of interaction of the two resonant circuits by increasing the "Q" of the unused resonant circuit. While this approach may be adequate for this simple resonant circuit, it becomes cumbersome and impractical with complex filter circuits.

Diplexer circuits are commonly used in television to connect aural and visual transmitters to the same antenna. Multiplexers are also used to connect several communications tranceivers to a common antenna.

Some prior art relating to the subject matter of this invention is found in the following U.S. Pat. Nos.: 2,776,373, Mischler; 2,900,457, Stull; 3,009,114, Meissner; 3,222,612, Ray; 3,223,928, Fayman.

SUMMARY OF THE INVENTION

The invention retates to a circuit connected to a source of frequencies, which can easily change its bandpass characteristics to allow only a desired filtered frequency to pass to its output. To accomplish this the circuit uses a switching means to switch the source to any one of a plurality of bandpass filters and uses a multiplexer to combine the outputs of the filters without distributing their bandpass characteristics.

This circuit has advantage over the prior art for several reasons. The use of a multiplexer affords isolation between the bandpass filters and permits conventional high quality bandpass filters to be used. Semiconductor switching circuits typically have too much capacitance to provide adequate isolation at high frequences, and they can be more expensive than multiplexers.

When used with a mixer as the source of frequencies, the invention allows frequency production over a large range of frequencies that is particularly useful in multi-frequency transmitters and receivers.

DETAILED DESCRIPTION OF THE PREFERRED EMBODIMENT

Figure 1:
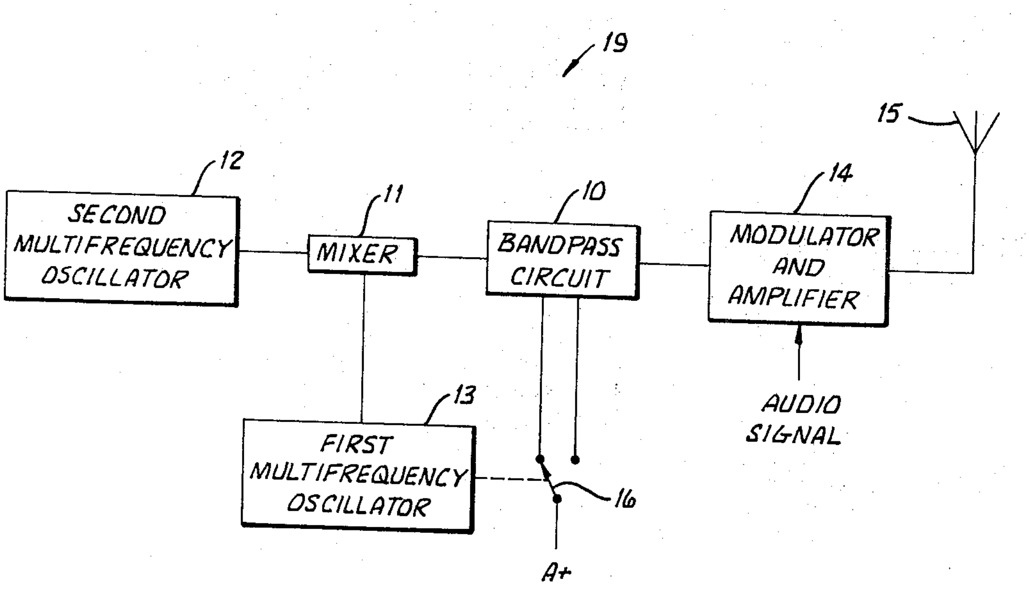
FIG. 1 is a block diagram of a radio transmitter which uses a bandpass circuit embodying the invention.

Referring to the drawings in detail, FIG. 1 is a block diagram of a multi-frequency transmitter 19. This diagram is descriptive of a navigation and communication transmitter which has crystal saving circuits for eliminating the need for a crystal for every channel. A first multi-frequency oscillator 13 has 18 crystals to cover from 139.437 to 156.437 MHz in 1 MHz steps. A second multi-frequency oscillator 12 has 20 crystals to cover from 21.487 to 20.437 MHz in 50 KHz steps. These two oscillators feed the mixer 11 to produce a range of difference frequencies of which from 118 to 135.95 MHz are useful in aircraft navigation and communication.

To minimize the strength of unwanted heterodyne frequencies and harmonics, a bandpass circuit 10 is used. It can pass either the upper part of the desired range (127–136 MHz) or the lower part of the desired range (118–127 MHz) depending upon the position of switch 16. This switch is linked to the frequency selecting means of the first multi-frequency oscillator so that the appropriate part of the range is selected for the crystal which is chosen.

The output of the bandpass circuit 10 connects to modulator and amplifier 14 where the filtered carrier is modulated by an audio signal. The modulated signal then passes to an antenna 15.

Figure 2:
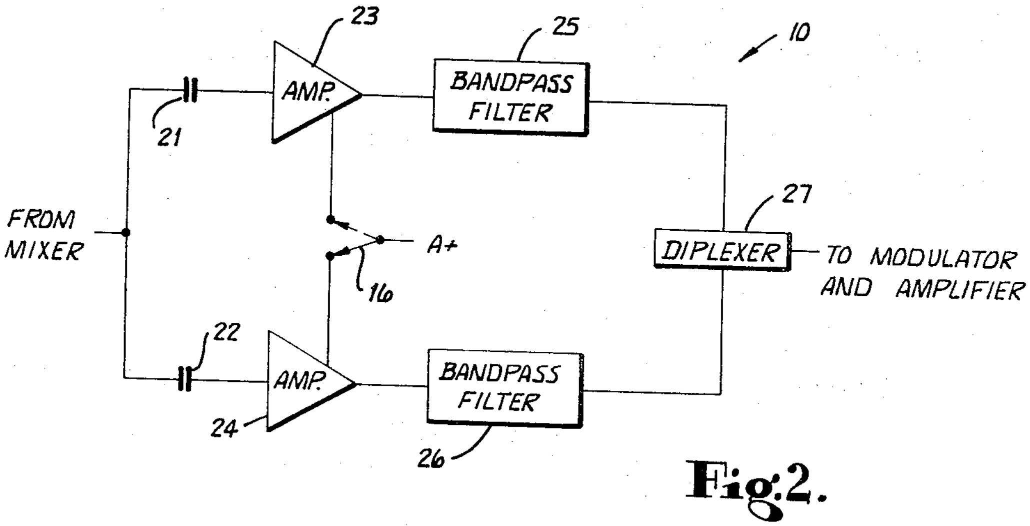
FIG. 2 is a block diagram of the bandpass circuit of FIG. 1.
Figure 3:
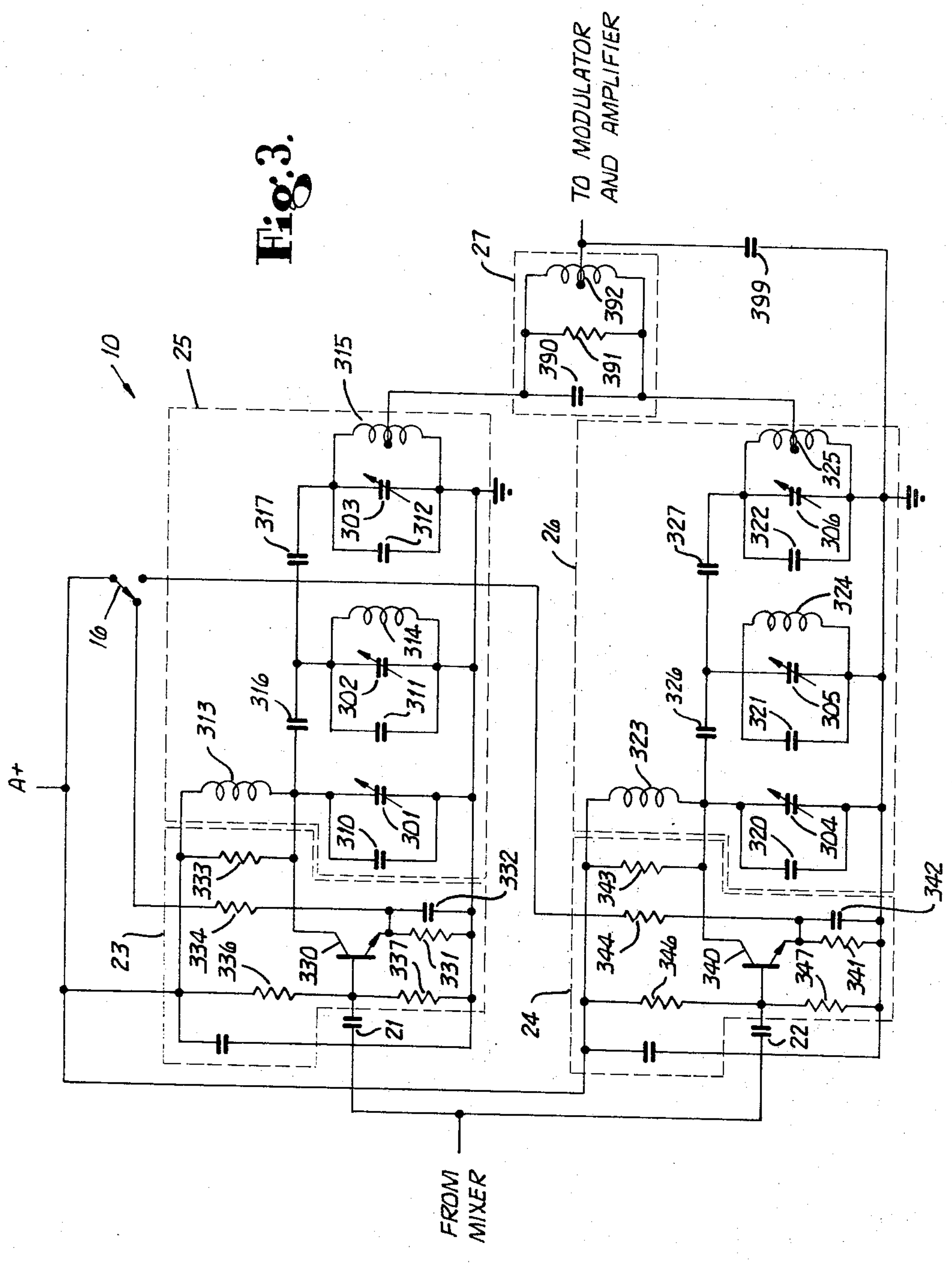
FIG. 3 is a circuit diagram of the block diagram of FIG. 2.

The bandpass filter is illustrated in block diagram form in FIG. 2 and in detailed circuit form in FIG. 3. The frequencies from the mixer are coupled through capacitors 21 and 22 to two transistor amplifiers 23 and 24. The transistors 330 and 340 will amplify unless biased off by a 14 V.D.C., A+, from switch 16. The amplifiers 23 and 24 consist of base biasing resistors 336 and 346 (3.3 KΩ) and 337 and 347 (1.2 KΩ); emitter biasing resistors 331 and 341 (220Ω); transistors 330 and 340; collector loading resistor 333 and 343 (4.7 KΩ); and emitter bypass capacitor 332 and 342 (220 PF). The bandpass filters 25 and 26 are tuned to pass adjacent bands. Filter 25 is a three pole bandpass filter. Inductor 313 and capacitors 310 and 301 comprise a first resonant circuit. Capacitor 316 connects this first circuit to a second which has inductor 314 and capacitors 302 and 311. Capacitor 317 connects the second circuit to a third which has inductor 315 and capacitors 302 and 312.

Filter 26 is similar in construction to filter 25, but is tuned to a different band. The third resonant circuits of each filter have an output which is taken from a tap on their inductances 315 and 325. These outputs connect to a diplexer 27.

The diplexer is a two input multiplexer. The term multiplexer is meant to refer to a passive circuit which has a large amount of isolation between any two of its plurality of inputs and a low impedance from any of its inputs to its output. Such multiplexers are commonly used for connecting a plurality of communications transceivers to one antenna. The diplexer 27 will exhibit about 20 dB of isolation between its inputs in the circuit described. The diplexer 27 includes a capacitor 390 (4.7 PF), a resistor 391 (100Ω) and an inductor 392. The output is taken from a tap on the inductor 392 and the output impedance is caused to be 50Ω by capacitor 399 (22 PF).

In operation, when a crystal is selected in oscillator 13, switch 16 is caused to switch A+ to either resistor 334 or 344 (220Ω) which causes transistor 330 or 340 to be biased off. This allows the frequencies from the mixer to couple only to the filter 25 or 26 associated with the other transistor 330 or 340 which is amplifying and not biased off. The output of the amplifying transistor is filtered by its associated filter and passes through the diplexer 27 to the modulator and amplifier.

Two or more bandpass filters cannot be connected together at a common point and work properly. The interaction between the two filters is so great that neither works properly. By the use of a multiplexer, filters can all be coupled to a common point without one adversely affecting another.

I claim:

1. A circuit for producing a plurality of different frequencies which comprises:

a. means providing a single source of frequencies, b. a plurality of bandpass filters, each having an input and an output and each being tuned to a different band, c. switching means for coupling said source to any one of said inputs of said plurality of bandpass filters, d. a multiplexer means having an output and a plurality of inputs, each input of the multiplexer means being connected to an output of a respective one of said plurality of bandpass filters.

2. The circuit of claim 1 in which two of the bandpass filters are tuned to adjacent bands.

3. The circuit of claim 2 in which there are only two bandpass filters and two multiplexer means inputs.

4. The circuit arrangement of claim 3 wherein said multiplexer is a diplexer which comprises a first capacitance, a resistance and an inductance each of which has a first end and a second end; said first ends of said resistance, capacitance and inductance being connected together and defining one of said diplexer inputs; said second ends of said resistance, capacitance and inductance being connected together and defining the other of said diplexer inputs; said inductor having a center tap which defines the output of said diplexer; and a second capacitance connected between said diplexer output and ground.

5. The circuit of claim 4 in which said bandpass filters each have a plurality of resonant circuits.

6. The circuit of claim 10 in which said means providing a single source of frequencies provides a single source of radio frequencies.

7. The circuit of claim 1 in which the switching means includes one semiconductor device associated with each one of said plurality of bandpass filters.

8. The circuit of claim 7 in which said semiconductor devices are transistors.

9. The circuit of claim 8 in which said source is coupled to the input of one of said bandpass filters only when its associated transistor is biased to amplify.

10. The circuit of claim 1 in which the source of frequencies is the output of a mixer.

11. The circuit of claim 1 in which said bandpass filters each have a plurality of resonant circuits.

12. The circuit of claim 1 in which said means providing a single source of frequencies provides a single source of radio frequencies.

* * * * *